United States Patent [19]

Moore et al.

[11] Patent Number: 5,294,417

[45] Date of Patent: Mar. 15, 1994

[54] PROCESS FOR REMOVAL OF MERCURY FROM HYDROXYL-AMMONIUM NITRATE SOLUTIONS

[75] Inventors: Sanders H. Moore; James F. Pickering; Ronald L. Dotson; Carey O. Burger, all of Cleveland; Jeffery D. Casteel; Phillip J. Reed, both of Englewood; Richard E. Mellor, Charleston, all of Tenn.

[73] Assignee: Olin Corporation, Cheshire, Conn.

[21] Appl. No.: 864,244

[22] Filed: Apr. 6, 1992

[51] Int. Cl.⁵ .................................................. C02F 1/76
[52] U.S. Cl. .................................... 423/101; 210/753; 210/754; 210/756
[58] Field of Search ................ 423/101; 210/753, 754, 210/756

[56] References Cited

U.S. PATENT DOCUMENTS

| | | | |
|---|---|---|---|
| 3,194,629 | 7/1965 | Dreibelbis et al. | 23/2 |
| 3,736,253 | 5/1973 | De Angelis et al. | 423/101 |
| 3,755,161 | 8/1973 | Yokota et al. | 210/36 |
| 3,802,910 | 4/1974 | Gerow et al. | 117/100 M |
| 3,847,598 | 11/1974 | Coulter et al. | 423/101 |
| 3,849,537 | 11/1974 | Allgulin | 423/210 |
| 4,033,764 | 7/1977 | Colegate et al. | 423/24 |
| 4,094,777 | 6/1978 | Sugier et al. | 210/32 |
| 4,101,631 | 7/1978 | Ambrosini et al. | 423/210 |
| 4,137,166 | 1/1979 | Heimberger et al. | 210/756 |
| 4,147,626 | 4/1979 | Findlay et al. | 423/101 |
| 4,160,730 | 7/1979 | Nguyen | 423/101 |
| 4,167,481 | 9/1979 | Cremers et al. | 210/36 |
| 4,474,896 | 10/1984 | Chao | 502/216 |
| 4,503,017 | 3/1985 | Gadd et al. | 423/101 |
| 4,614,592 | 9/1986 | Googin et al. | 210/679 |
| 4,752,398 | 6/1988 | Holbein et al. | 210/679 |
| 4,874,525 | 10/1989 | Markovs | 210/673 |
| 4,902,662 | 2/1990 | Toulhoat et al. | 502/216 |
| 4,946,596 | 8/1990 | Furuta et al. | 210/679 |
| 5,006,165 | 4/1991 | Grossman et al. | 75/407 |
| 5,062,966 | 11/1991 | Dotson et al. | 210/756 |
| 5,080,799 | 1/1992 | Yan | 210/661 |

FOREIGN PATENT DOCUMENTS 962842  2/1975  Canada ................................ 423/101

Primary Examiner—Wayne Langel
Attorney, Agent, or Firm—Dale Lynn Carlson

[57] ABSTRACT

A process for the removal of mercury from industrial waste streams is disclosed wherein the waste stream is a nitrate based solution that has been decomposed by the addition of hypochlorite. The method involves adding a reducing agent to reduce the hypochlorite and/or adjusting the pH by the use of a strong acid to less than about 2.0, converting any residual chlorine to a soluble unreactive salt, adding a soluble precipitating agent, such as sodium sulfide, to the solution in a ratio to the mercury present of greater than 1:1 to about 2:1 to precipitate out the mercury as a mercury compound. The solution is then filtered to remove the precipitated mercury compound.

10 Claims, 1 Drawing Sheet

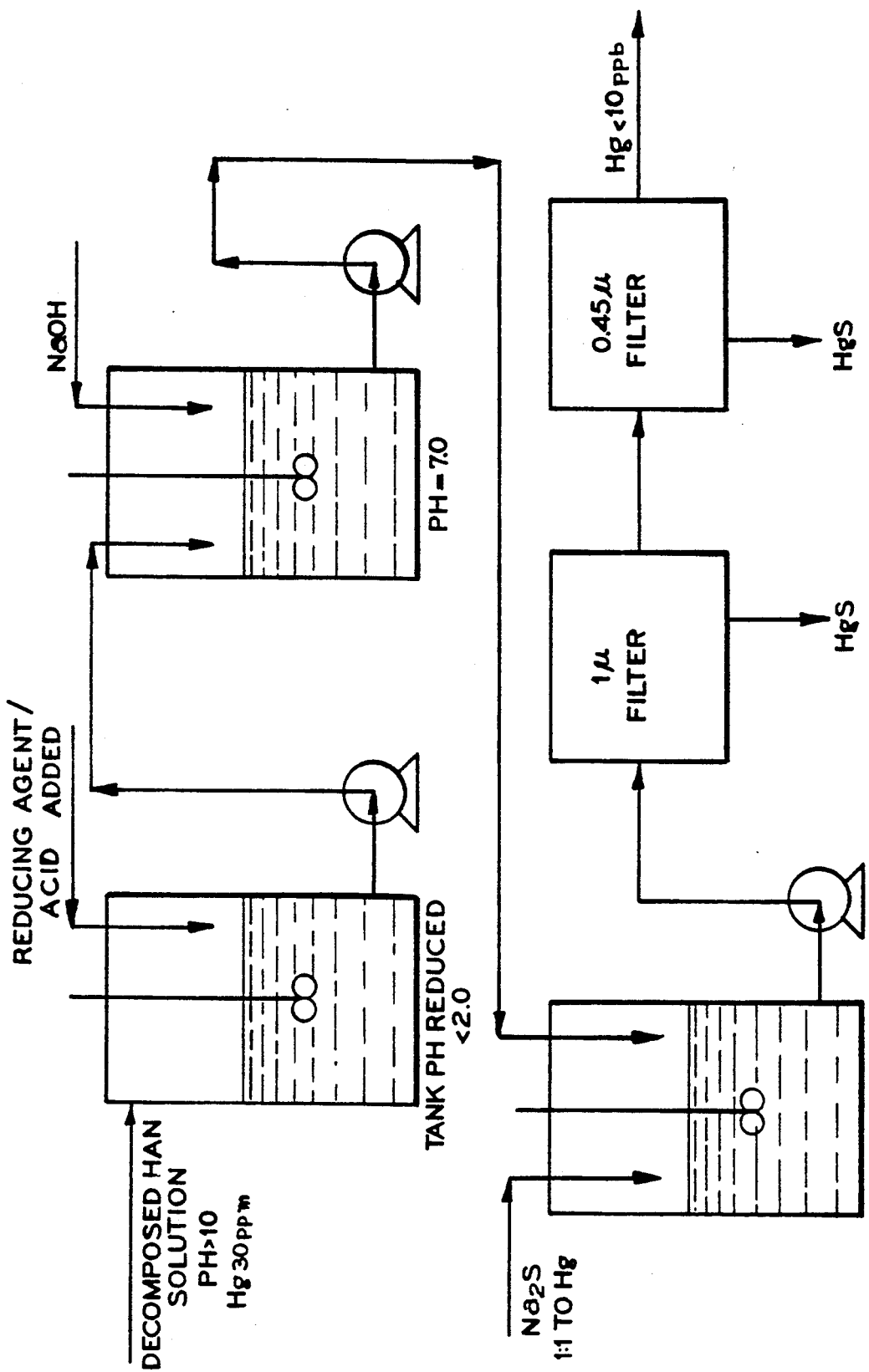

PROCESS FOR REMOVAL OF MERCURY FROM HYDROXYL-AMMONIUM NITRATE SOLUTIONS

The U.S. Government has rights in this invention pursuant to Contract No. DAAA 15-89C-0011 awarded by the Department of Army. Under this contract, the U.S. Government has certain rights to practice or have practiced on its behalf the invention claimed herein without payment of royalties.

BACKGROUND OF THE INVENTION

This invention relates generally to the process of the removal of mercury from waste streams in an industrial environment. More specifically, the present invention is directed to the removal of mercury from a solution of hydroxylammonium nitrate, such as hydroxy/ammonium/nitrate (HAN).

A common process to remove mercury from waste streams of chlor-alkali plants is the use of a sulfide treatment to produce a very insoluble mercury sulfide precipitate that can be filtered and removed from the liquid flow stream.

Mercury presence in solutions, such as those which derive from the decomposition of hydroxylammonium nitrate, present an additional problem which prevents the standard sulfide treatment from being effective. Normally, the decomposition of the HAN has occurred via a previous hypochlorite treatment step. The addition of sulfide or a sulfide treatment to HAN based nitrate a solution where decomposition of the HAN has not occurred does not effectively remove mercury.

These problems are solved by the process of the present invention which removes all of the hypochlorite prior to treating the solution to precipitate out the mercury as a sulfide and permit its removal by filtration.

SUMMARY OF THE INVENTION

It is an object of the present invention to provide a simple and effective method for removing mercury from nitrate solutions such as those derived from hydroxylammonium nitrate.

It is another object of the present invention to provide a safe and effective procedure for removing potentially harmful mercury from solutions of hydroxylammonium nitrate.

It is a feature of the present invention that all of the hypochlorite in the solution is effectively removed by addition of a reducing agent.

It is another feature of the present invention that a strong acid can be added to the nitrate solution to adjust the pH to less than about 7.0.

It is still another feature of the present invention that the treated solution is then allowed to stand for a period of time effective to react and release all hypochlorate in solution.

It is another feature of the present invention to adjust the pH to about 6.5 to about 7.5.

It is still a further feature of the present invention that a soluble precipitating agent such as sodium sulfide, is added to the solution in a ratio of from about 1:1 to about 2:1 of precipitating agent to mercury.

It is an advantage of the present invention that a precipitated mercury compound, such as mercury sulfide, is formed by the process and removed through filtration.

It is still another advantage of the present invention that the filtrate containing the precipitated mercury compound, such as mercury sulfide, may be removed in dry cake form and deposited or secured for disposal or recycle.

These and other objects, features and advantages are obtained by the process of the present invention to remove mercury from a nitrate based solution having hypochlorite and decomposed hydroxylammonium nitrate present by adding a reducing agent to the solution to reduce the hypochlorite, adjusting the pH, adding a soluble precipitating agent to the solution in a desired ratio to the mercury present to cause the mercury to precipitate out as a mercury compound, and removing the precipitated mercury from the solution.

BRIEF DESCRIPTION OF THE DRAWINGS

The objects, features and advantages of the invention will become apparent upon consideration of the following detailed disclosure of the invention, especially when it is taken in conjunction with the accompanying drawings wherein:

FIG. 1 is a diagrammatic illustration of the treatment steps employed with treating a decomposed HAN solution normally having a pH of 10 or greater and a measureable mercury composition above at least 30 parts per billion.

DETAILED DESCRIPTION OF THE PREFERRED EMBODIMENT

The development of a process for the manufacture of hydroxylammonium nitrate (HAN) using a liquid metal cathode, such as mercury, in an electrolytic cell has also required the development of effective waste treatment unit operations. Techniques have been developed for decomposing the "off" specification product and to control the mercury concentration of material being passed in waste stream solutions to waste disposal. The decomposition process is tailored to take advantage of the optimum, conditions for oxidation of HAN, using hypochlorite as the oxidizing agent. This process is described in greater detail in U.S. Pat. No. 5,062,966 which issued Nov. 5, 1991 to Dotson et al. This patent is assigned to the assignee of the present invention and is specifically incorporated herein by reference in pertinent part.

Mercury waste removal after HAN decomposition requires specific processing steps, including using a soluble precipitating agent, such as sodium sulfide, followed by a physical separation step, such as filtration, to remove heavy metals from solution. The chemistry of these specific processing steps is discussed below.

REMOVAL OF HAN

Oxidation of any hydroxylammonium salts, such as hydroxylammonium nitrate, present in the waste stream solution can be accomplished by reacting an alkaline hypochlorite with the HAN or other hydroxyl ammonium salts. Acid conditions during the mixing of hydroxyl ammonium nitrate or other hydroxylammonium salt chlorine must be avoided. The following equation describes the preferred process:

$$4(NH_3OH)NO_3 + 3NaOCl + 4NaOH \longrightarrow$$

$$10H_2O + 3NaCl + N_2O + N_2 + 4NaNO_3.$$

The treatments with hypochlorite must be carried out under alkaline conditions to avoid the formation of NCl₃, which is a shock and thermally sensitive material that may form when chlorine reacts with nitrogen compounds in acid conditions. The pH must be maintained above 8 when adding the hypochlorite to the solution. Samples from the treatment tank should be taken and small amounts of hypochlorite added to determine the reaction ratios. Hypochlorite must be added to the treatment vessels until no further gassing is observed. At this point the HAN is decomposed.

A typical batch of waste solution in an approximately 5000 gallon treatment tank can require about 25 to about 50 gallons of about 32% hypochlorite, reacted at about 50° C. and at a pH of about 10.

REMOVAL OF EXCESS HYPOCHLORITE

After the hypohalite has decomposed the hydroxylammonium compound, any excess hypohalite must be reduced prior to the treatment of the solution with a sulfide and the pH of the solution must be adjusted to about 7.5 or lower. The hypohalite may be reduced using sodium hydrosulfite of the type sold under the trademark REDUCTONE® by Olin Corporation. The sodium hydrosulfite reacts with excess chlorine according to the following oxidation reactions, in which the dithionite solutions are powerful reducing agents under alkaline conditions:

$$4OH^- + S_2O_4^= \longrightarrow 2SO_3^= + 2H_2O + 2e,$$
$$-1.12 \text{ volts oxidation potential.}$$

The dithionite solutions possess less reducing power in acid solutions:

$$2H_2O + HS_2O_4^- \longrightarrow 2H_2SO_3 + H^+ + 2e,$$
$$0.08 \text{ volts oxidation potential.}$$

These solutions are readily oxidized by air, producing the bisulfite as follows:

$$Na_2S_2O_4 + H_2O + O_2 \rightarrow NaHSO_3 + NaHSO_4.$$

For this reason, the pH is maintained at about 7 or above before the sodium hydrosulfite is added, and the excess chlorine reacts as follows to form chloride:

$$Cl_2 + 2e \rightarrow 2Cl^-.$$

Typically a 4800 gallon treatment tank filled with an alkaline solution can require about 5 to about 10 gallons of sodium hydrosulfite to completely remove all of the excess hypochlorite and chlorine in the waste solution, before moving the waste solution to one of the sulfide treatment tanks. If the hypochlorite is not removed prior to treatment with sulfide, its presence can lead to the formation of mercury polysulfides. These are formed under alkaline conditions in the presence of excess sulfide and are soluble, which would make it extremely difficult, if not impossible, to remove the mercury from the solution once the polysulfides are formed.

ADDITION OF SODIUM SULFIDE

Ionic mercury, in the mercurous ion form, is unique in that it exists only in the dimeric form, $Hg_2^{+2}$, and never as a simple monomer. In solution this ion will exist only below a pH of about 3 to about 4 because of its reactivity with water or hydroxyl ions at higher pH values via disproportionation reactions as follows:

$$Hg_2^{+2} + 2OH^- \rightarrow Hg + H_2O + HgO.$$

Only the nitrate and perchlorate are at all water-soluble. The solubility product for $Hg_2Cl_2$ is $1.1 \times 10^{-18}$. The carbonate and sulfide are less soluble than this. Precipitation reactions involving ionic mercury ions are complicated by the disproportionation reactions yielding elemental mercury and mercuric compounds, as follows, including the equilibrium constant for the disproportionation reaction:

$$Hg + Hg^{+2} \rightarrow Hg_2^{+2}, K=166.$$

This reaction reveals that at equilibrium the mercurous ion concentration is only 166 times that of mercuric ion. Hence, if the mercurous ion is not bound in a compound, such as through insolubility or complex formation, conversion of the mercurous to the mercuric material and elemental mercury occurs readily. This is illustrated in the above reaction involving the hydroxyl ion and is further reflected in the following equations:

$$Hg_2^{+2} + H_2S \rightarrow Hg + 2H^+ + HgS$$

$$Hg_2Cl_2 + 2NH_3 \rightarrow Hg + NH_4^+ + Cl^- + HgNH_2Cl$$

The mercurous ion forms no complexes.

Reduction to elemental mercury is readily achieved, but oxidation to the mercuric ion is more difficult. The potentials for the elemental mercury to mercuric ion [Hg(0)-Hg(II)] and the mercurous to mercuric ion [Hg(I)-Hg(II)] couples are so close to that for the elemental mercury to mercurous ion [Hg(0)-Hg(I)] couple that oxidation of mercury invariably gives the mercuric form, unless an excess of the metal is present.

CHLORIDE ION

Mercurous chloride is readily soluble in concentrated nitric acid or aqua regia solution because of oxidation. This is shown, for example, by the following equation:

$$3Hg_2Cl_2 + 16H^+ + 4NO_3^- \longrightarrow$$
$$4NO + 8H_2O + 3Cl_2 + 6Hg^{+2}.$$

Mercurous chloride is darkened by aqueous ammonia, as follows:

$$Hg_2Cl_2 + 2NH_3 \rightarrow Hg + NH_4^+ + Cl^- + HgNH_2Cl$$

The Hg is black and the HgNH₂Cl is white.

CARBONATE ION

When carbonate, such as sodium bicarbonate, is added to the waste solution as a buffering agent, the carbonate ion precipitates as a reddish-brown basic carbonate, and the carbonate tends to buffer the solution to a pH above about 6.5 because of its behavior as a weak acid. This is shown by the following equation:

$$4Hg^{+2} + 4CO_3^{-2} \rightarrow HgCO_3 \cdot 3HgO + 3CO_2.$$

SULFIDE ION

The sulfide ion from a soluble sulfide, such as hydrogen sulfide, sodium or ammonium sulfide, thioacetamide, or even thiosulfate solutions, precipitates black mercuric sulfide mixed with elemental mercury. Because of the extremely small solubility of the mercuric sulfide, the reaction occurs even in strongly acidic solutions. Intermediate white, yellow, and brown precipitates often form first. These are double compounds, such as $2HgSHgCl_2$, which are converted by sulfide into the simple sulfide. Mercuric sulfide is insoluble in hot dilute acids, but reacts slowly with hot concentrated nitric acid to form white $2HgSHg(NO_3)_2$ and ultimately dissolves. It is very soluble in aqua regia, as reflected by the following equation:

$$3HgS + 8H^+ + 12Cl^- + 2NO_3^- \longrightarrow$$
$$2NO + 4H_2O + 3[HgCl_4]^{-2} + 3S$$

Mercuric sulfide is insoluble in sodium or potassium hydroxide solution, but is sufficiently acidic that it dissolves in the higher concentration of sulfide present in sodium or potassium sulfide solution according to the following equation:

$$HgS + S^{-2} \rightarrow [HgS_2]^{-2}.$$

Such solutions precipitate the sulfide upon dilution because of hydrolysis of the equilibrium sulfide ion, as follows:

$$[HgS_2]^{-2} + H_2O \rightarrow HgS + OH^- + SH^-$$

Maintenance of the species in solution thus requires a large quantity of alkali-metal sulfide, alone or with added alkali-metal hydroxide. Stronger acids than water effect precipitation of mercuric sulfide even more readily:

$$[HgS_2]^{-2} + NH_4^+ \rightarrow HgS + HS^- + NH_3$$

$$[HgS_2]^{-2} + 2H^+ \rightarrow HgS + H_2S$$

The chemistry in this step is based on the ionization of the polybasic acid, hydrogen sulfide, and takes place in steps. The dissociation of hydrogen sulfide occurs as follows:

$$H_2S \rightarrow H^+ + HS^-$$

and $$HS^- \rightarrow H^+ + S^=.$$

The ionization constant for the primary dissociation, $K_1$, equals $5.7 \times 10^{-8}$, while that for the secondary dissociation constant, $K_2$, is $1.2 \times 10^{-15}$, and is not considered because it is so much smaller than $K_1$ that only $K_1$ has an appreciable effect, where:

$$K_1[H^+][HS^-]/[H_2S] = 5.7 \times 10^{-8}.$$

SULFIDE ADDITION

Considering the reaction $$Hg^{+2} + Na_2S \rightarrow HgS + 2Na^+$$

to be the predominant reaction after all of the HAN has been decomposed, the grams of sodium sulfide to be added to the waste solution can be calculated by the following formula:

ppmHg(Gal) [3.7851/Gal × 1000 ml/l × 78 g/m]/(200 g/m × 0.6 × 10⁶) = ppmHg × (Gal) × 0.0025 = grams of 60%

Na₂S to be added to the solution.

In order to exemplify the results achieved, the following examples are provided without any intent to limit the scope of the instant invention to the discussion therein. The examples are intended to illustrate the process by which mercury was successively removed from solutions generated as part of the waste stream in conjunction with the production of hydroxylammonium nitrate. The mercury concentration remaining in the solution in each instance was determined by the United States Environmental Protection Agency approved Manual Cold Vapor Technique, Method 245.1, as described in EPA-600/4-79-020 publication, revised March 1983.

EXAMPLE 1

About 4,000 gallons of solution from the production of hydroxylammonium nitrate was collected in a treatment tank. The initial pH of the solution was not recorded, but was acidic. The solution was treated with about 113 gallons of about 50 percent by weight sodium hydroxide to raise the pH of the solution to a pH of about 10. The solution was then reacted with about 350 gallons of sodium hypochlorite to instantaneously decompose any hydroxylammonium nitrate or other hydroxylammonium salts in the solution, accompanied by heat and copious $N_2O$ gas generation. The pH of the solution, after the addition of the hypochlorite ions in solution form, was determined to be about 9.2.

Thereafter about a 30% by weight solution of sodium hydrosulfite reducing agent was added to the waste solution in the amount of about 480 gallons to serve as a reducing agent to reduce the sodium hypochlorite. About 80 gallons of about 37% by weight hydrochloric acid was added to the solution to adjust the pH downward to a level of about 6.9 and to remove any residual hypochlorite. Next, 100 pounds of sodium bicarbonate was added as a buffering agent to stabilize the pH and to precipitate any mercury as mercuric carbonate. The total mercury, after allowing the solution to stand for about 90 minutes and be filtered through a pressure leaf filter to physically separate the mercury from the solution, was determined to be about 5.6 parts per million (ppm) and the ionic mercury concentration was determined to be about 5.5 ppm. About 500 grams of sodium sulfide was added after another 30 minutes to serve as a precipitating agent. About 10 pounds of a filter aid, solka floc, and about 5 pounds of another filter aid, dicalite, were added to the pressure leaf filter prior to filtering the solution After another hour of standing and filtering, the total mercury content was determined to be 100 parts per billion (ppb) in the solution. After another 30 minutes, 300 grams of sodium sulfide was added to the solution. Three and a half hours later an additional 10 pounds of the filter aids solka floc and 5 pounds of dicalite were added to the pressure leaf filter. After another hour of standing, the solution was filtered through the pressure leaf filter and the total mercury concentration was detected as about 83 ppb. After 30 minutes an additional 100 grams of sodium sulfide was added and 30 minutes later the solution was again filtered and the total mercury concentration was determined to be about 79 ppb. After an additional 30 minutes, 200 more grams of sodium sulfide were added to the waste solution and after circulating the solution for about 29 hours, the solution was allowed to settle and was again filtered. The total mercury concentration was determined to be about 16 ppb.

EXAMPLE 2

About 4,800 gallons of waste solution from the production of hydroxylammonium nitrate was collected in a treatment tank. The solution had a pH of about 0.1. About 152 gallons of about 50 percent concentration of sodium hydroxide was added to the waste solution to raise the pH to about 10.0. About 225 gallons of sodium hypochlorite was added to the solution to decompose the hydroxylammonium nitrate salts, accompanied by heat and copious $N_2O$ gas generation. This adjusted the pH to about 9.5.

Thereafter, about 225 pounds of about 30% by weight sodium hydrosulfite solution was added to the waste solution as a reducing agent. About 508 pounds of about 37% by weight hydrochloric acid was added to the solution in two stages, the first stage adding about 200 pounds, to adjust the pH of the solution initially to about 8.5 and then to about 6.8. About 100 pounds of sodium bicarbonate was added as a buffering agent, adjusting the pH to about 7.2. After standing for about 90 minutes, the solution was filtered through a pressure leaf filter to determine the total mercury concentration in the waste solution as about 12.5 parts per million (ppm) and the ionic mercury as about 10.0 ppm.

After an additional hour, about 300 grams of sodium sulfide was added to the solution and after an hour the solution was filtered and the ionic mercury was measured at 100 parts per billion (ppb) in the waste solution. After an additional hour about another 200 grams of sodium sulfide was added to the solution. After an additional hour about another 200 grams of sodium sulfide was added to the solution and the solution was let stand for an hour. The solution was again filtered and the ionic mercury content in the solution was measured at about 76 ppb. After about another 200 grams of sodium sulfide was added to the solution, the solution was allowed to stand for an hour and again filtered. The ionic mercury level in the solution was then detected at about 24 ppb. Immediately thereafter about 10 pounds of a filtering aid, solka floc, was added to the pressure leaf filter, followed 15 minutes later by the addition of about 5 pounds of dicalite filtering aid. After about 75 minutes, the solution was filtered and the total mercury concentration in the solution was measured at about 16 ppb. After an additional 75 minutes about 200 grams of sodium sulfide was added to the solution and allowed to circulate for about 25¼ hours. The total mercury concentration, after allowing for settling and filtration at that point was measured at about 5 ppb.

EXAMPLE 3

About 2,000 milliliters (ml) of about 2.8 molar hydroxylammonium nitrate solution from the production of hydroxylammonium nitrate was collected in a treatment tank. About 400 ml of about 50 percent concentration of sodium hydroxide was added to the solution to raise the pH to about 11.8. About 1680 ml of about 12 percent by weight sodium hypochlorite was added to the solution to decompose the hydroxylammonium nitrate and to yield a mercury composition of about 30 parts per million. Sulfuric acid was added to the solution sufficient to adjust the pH of the solution to less than about 2.0. The solution was then allowed to stand overnight to remove excess hypochlorite.

Thereafter, about 0.019 grams of about 62% flake sodium sulfide was added to the solution in about a 1:1 ratio of $Na_2S$ to mercury. The solution was allowed to stand for about 5 minutes and the solution was passed through a 1 micron filter, yielding about 350 parts per billion (ppb) of mercury. After an additional 20 minutes, the solution was again passed through the same size filter, yielding about 280 ppb of mercury. The heavy sodium sulfide flocculant caused a very slow filtration rate of about 300 ml in 20 minutes.

Thereafter, successive sodium sulfide solution additions and solution filtrations were performed yielding the following indicated levels of mercury:

5 ml of about 0.009 g/ml $Na_2S$; Hg=192.95 ppb
5 ml of about 0.009 g/ml $Na_2S$; Hg=107.21 ppb
5 ml of about 0.009 g/ml $Na_2S$; Hg=72.21 ppb
10 ml of about 0.009 g/ml $Na_2S$; Hg=49.26 ppb
10 ml of about 0.009 g/ml $Na_2S$; Hg=39.41 ppb
10 ml of about 0.009 g/ml $Na_2S$; Hg=23.75 ppb
10 ml of about 0.009 g/ml $Na_2S$; Hg=27.76 ppb After the last addition the solution began to cloud and had a slight sulfide odor. The total amount of sodium sulfide added was about 0.685 grams.

While the preceding examples have described primarily hydroxylammonium salts, it is to be understood that those salts being treated include hydroxylammonium sulfate, hydroxylammonium chloride, hydroxylammonium phosphate and hydroxylammonium nitrate, among others. Although the treatment process describes the use of sodium hypochlorite, it is to be understood that any suitable source of hypohalite ions may be used, such as hypobromite ions, hypoiodite ions, or mixtures thereof with hypochlorite ions, when dissolved in water. These hypohalite ions may be combined in the compounds with alkali metal or alkaline earth metals to form salts, such as sodium hypochlorite, potassium hypochlorite, lithium hypochlorite, lithium hypobromite, dibasic magnesium hypochlorite, calcium hypochlorite and calcium hypobromite tetrahydrate. It is also possible to use alkaline aqueous solutions of hypohalous acids, such as hypochlorous acid, hypobromous acid and hypoiodous acid, that can be prepared by the addition of chlorine, bromine, and iodine, respectively, to water.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

What is claimed is:

1. A process for the removal of mercury from an aqueous solution containing a hydroxylammonium nitrate comprising:

(a) adjusting the pH of the solution to above 8;
(b) reacting the alkaline solution with a source of hypochlorite ions sufficient to decompose the hydroxylammonium nitrate;
(c) reducing the hypochlorite;
(d) adjusting the pH of the solution to less than about 7.0;
(e) adding a soluble precipitating agent to the solution in an effective amount to cause mercury to precipitate out as an insoluble mercury compound; and
(f) removing the precipitated insoluble mercury compound.

2. The process according to claim 1 in which the pH is adjusted by adding to the solution an acid selected from the group consisting of hydrochloric acid, sulfuric acid, nitric acid, phosphoric acid and perchloric acid.

3. The process according to claim 1 in which the reducing agent is sodium hydrosulfite.

4. The process according to claim 1 in which the precipitating agent is a soluble sulfide.

5. The process according to claim 4 in which the precipitating agent is sodium sulfide.

6. The process according to claim 1 in which the soluble precipitating agent is added to the solution in a ratio of from about 1:1 to about 2:1 of precipitating agent to mercury.

7. The process according to claim 1 in which a buffering agent selected from the group consisting of phosphates, carbonates, silicates, metaphosphates and mixtures thereof is added to the solution to stabilize the pH.

8. The process according to claim 7 in which sodium bicarbonate is the buffering agent.

9. The process according to claim 1 in which the precipitated mercury compound is removed by a physical separation process.

10. The process according to claim 9 in which a filtration agent is added to the solution to assist in filtering the precipitated mercury compound from the solution.

* * * * *